Patented Oct. 5, 1948

2,450,534

UNITED STATES PATENT OFFICE 2,450,534

EMULSION PRINTING INKS

Andries Voet, New York, N. Y., assignor, by mesne assignments, to J. M. Huber Corporation, New York, N. Y., a corporation of New Jersey No Drawing. Application August 4, 1945,
Serial No. 609,014

13 Claims. (Cl. 106—28)

This invention relates to printing inks and particularly to new and improved emulsion printing inks.

Printing inks generally are made by incorporating finely divided pigments in liquid vehicles composed of water-immiscible organic substances. Emulsion inks, comprising pigments dispersed in aqueous emulsions of water-immiscible substances, have been proposed and used heretofore, but the known emulsion inks have important practical defects.

Those of the oil-in-water type, in which the aqueous phase is external, usually lack the tackiness desired for good printing, and when they are made with carbon black pigments a buttery consistency is observed that causes inadequate distribution of the ink on the rollers and forms of printing presses. These inks also tend to corrode printing presses, and water-sensitive composition rollers cannot be employed on presses where they are used.

Emulsion inks of the water-in-oil type contain the water-immiscible or oily substance of the vehicle in the external phase. Thus they are less corrosive and do not attack composition rollers, and they usually have the required tackiness. Known emulsion inks of this type, however, exhibit such poor flow qualities that they do not distribute evenly on printing presses, and poor reproduction of printed matter results in their use.

An object of this invention is to provide new and improved emulsion inks of the water-in-oil type which have highly satisfactory flow and printing qualities and which produce prints characterized by extreme sharpness of reproduction.

Another object of this invention is to provide emulsified black printing inks of that character which form smooth, even ink films on printing forms and on the paper printed, whereby the performance of the inks on printing presses is improved and printed matter of greater brilliancy is produced.

Another object is to provide quick-setting emulsion printing inks which do not penetrate deeply into the paper or other printed stock while being impressed and dried.

A further object of this invention is to provide emulsion printing inks which not only have superior flow and printing qualities as above mentioned under normal conditions of use, but which also are stable against physical or chemical deterioration under the various hot and cold climatic conditions to which the inks may be exposed.

Still another object is to provide improved printing inks as above mentioned which are quite economical to make and use, in that water constitutes a large part of the ink vehicle, and in that only a small quantity of emulsifying agent is required, and in that a highly stable emulsion is obtained in preparing them by the application of relatively mild agitation for a short period of time.

I have discovered that the above-mentioned and other important objects, advantages and results can be achieved by preparing printing inks to comprise dispersions of coloring matter in emulsoid vehicles composed essentially of water emulsified in water-immiscible organic liquid by means of surface active organic substances identified chemically as long-chain non-aromatic (aliphatic or heterocyclic) amines containing a linear hydrocarbon chain of at least 15 carbon atoms and having at least 18 carbon atoms attached to a nitrogen atom through carbon bonds.

Among the examples of such long-chain amines which have been used effectively according to this invention are octadecylamine, dioctadecenyl-amine, cetyldimethylamine, aminoethyl-2-heptadecyl-imidazoline, 1-hydroxylethyl-2-heptadecenyl-imidazoline, 1-octadecenyl-2-hydroxyethyl piperazine, and octadecyldimethylamine.

Other examples of such long-chain amines which are useful pursuant hereto are octadecenyl-amine, eicosylamine, ethyl cetyl amine, butyl cetyl amine, methyl octadecyl amine, ethyl octadecyl amine, allyl octadecyl amine, butyl heptadecyl amine, methyl eicosyl amine, di-octadecyl amine, benzyl cetylamine, isopropyl octadecyl amine, tertiary butyl cetylamine, 4-octadecyl piperidine, 4-octadecyl-N-methyl piperidine, N-cetyl piperazine, N-heptadecyl morpholine, 2-heptadecyl-4-ethyl imidazoline, 1-amino ethyl-2-cetyl imidazoline, 1-amino ethyl-2-heptadecenyl imidazoline, and 1-hydroxy ethyl-2-heptadecyl imidazoline.

The long-chain non-aromatic amines employed according to my invention are characterized by the chemical structure:

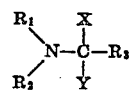

in which $R_1$ or $R_2$ or both are either hydrogen or non-aromatic organic groups attached to N through a carbon bond, and may be parts of the same or of different cyclic groups, $R_3$ is a non-aromatic hydrocarbon group having a linear chain of at least 15 carbon atoms, and X or Y or both are either hydrogen or organic groups and may be parts of a cyclic structure common to $R_1$ or $R_2$ or parts of different cyclic structures, the sum of the number of carbon atoms attached to nitrogen through carbon bonds being at least 8.

According to some embodiments of my invention, valuable inks for newspaper printing are made to contain suitable newsink oil, usually a petroleum hydrocarbon, as the predominant constituent, together with dispersed coloring matter including carbon black and water emulsified in the oil with a long-chain non-aromatic amine of the character described. The oil or water-immiscible phase of these inks may contain in solution a minor amount of any usual printing ink resin, such as modified or unmodified rosin to impart desired qualities of body or length to the ink.

According to other valuable embodiments of my invention, printing inks of the heat-set type, which are set quickly by the application of heat to the printed matter, are produced by first forming a water-immiscible liquid to contain resinous material suitable for binding the pigment dissolved in hydrocarbon liquid, or oil, having a low vapor pressure at ordinary temperatures and a rapid vaporization at elevated temperatures, and hereafter emulsifying water in the resulting oily vehicle with a long-chain non-aromatic amine of the character described and dispersing the desired coloring matter or pigments in the emulsion.

According to further embodiments of my invention, air-drying inks which are valuable for magazine printing, or for commercial printing in general, are produced by employing a drying oil as the predominant constituent, dispersing the pigment and any other desired coloring matter in this oil and emulsifying water therein with a long-chain non-aromatic amine of the character described. Again, suitable resinous material may be dissolved in the oil as part of the water-immiscible phase; and usual metallic driers, such as cobalt naphthenate or other heavy metal naphthenates, may also be dispersed in the ink, if desired, to accelerate its drying action, which occurs by oxidation or polymerization of the drying oil content.

In general the water content of my new inks is kept in a ratio of less than 5 to 1 to their content of water-immiscible organic matter, and improved emulsion inks of the water-in-oil type are formed. I have found that inks having the most favorable qualities are usually obtained when the water content is kept between 15 and 50% of the total weight.

Only a small quantity of the long-chain non-aromatic amine is required. In some cases quantities as low as 0.1% of the ink are effective, while in other cases as much as 2% may be desirable to obtain the best quality of ink. A quantity exceeding 2% is employed in exceptional cases where unusually large quantities of water are incorporated, although the usual upper limit of 2% can be exceeded in other circumstances without harm.

The emulsion inks of my invention may be prepared in several ways, as illustrated by the following: (1) The long-chain non-aromatic amine may be added to a black printing ink of the usual type having a water-immiscible organic vehicle, followed by the addition of the water during mild agitation. (2) The long-chain non-aromatic amine may be mixed first with the water, followed by the addition of this mixture to a usual ink during mild agitation. (3) A water-immiscible organic vehicle may be agitated mildly with a mixture of water and a long-chain non-aromatic amine of the character described, after which the pigment is dispersed in the emulsoid vehicle, by grinding or milling, in the usual way. (4) The long-chain non-aromatic amine may be incorporated into a water-immiscible organic vehicle, followed by the addition of water with mild agitation to obtain an emulsoid vehicle into which the pigment is incorporated afterward in the usual way. (5) The water and carbon black may be dispersed together in the form of a colloidal pigment dispersion which in turn may be emulsified with the water-immiscible organic vehicle by mild agitation in the presence of the long-chain non-aromatic amine. (6) When using colored pigments, the aqueous pulp obtained in the manufacture of such pigments may be dispersed directly into the water-immiscible organic liquid by mild agitation in the presence of the long-chain non-aromatic amine.

The following examples illustrate printing inks embodying my invention:

Example 1.—Emulsion news ink

To 80 parts of a commercial mineral ink oil (petroleum hydrocarbon oil) having a viscosity of 0.96 poise at 80° F. were added 8 parts of a varnish containing 3 parts of limed rosin dissolved in 5 parts of a mineral ink oil as mentioned above. Then 12 parts of carbon black were added, and the mixture was given two passes on a three-roller mill. Upon thereafter adding 0.3 part of octadecylamine and 30 parts of water and mildly agitating the resulting composition, a free-flowing emulsion ink valuable for commercial newspaper printing was formed.

Similarly valuable inks were produced in the same way by employing, in place of the octadecylamine, the same amounts of dioctadecenylamine, cetyldimethylamine, and aminoethyl-2-heptadecyl-imidazoline, respectively.

Example 2.—Emulsion "heat-set" ink

A water-immiscible liquid was formed by dissolving 45 parts of zincated rosin and 2 parts of paraffin wax in 25 parts of petroleum hydrocarbon solvent having a distillation range of 470° to 500° F., and at the same time 1 part of 1-hydroxyethyl-2-heptadecenyl-imidazoline was incorporated in this liquid. Then 25 parts of water were added and the mixture was agitated mildly to produce an emulsoid vehicle. Into this vehicle 15 parts of carbon black, 8 parts of lamp black and 5 parts of milori blue pigment were incorporated in the usual manner. An emulsion "heat-set" black ink of the water-in-oil type resulted which was completely stable and possessed excellent flow and printing qualities.

Similarly valuable black emulsion inks of the "heat-set" type were produced in the same way by employing 1 part of 1-octadecenyl-4-hydroxyethyl-piperazine in place of the 1-hydroxyethyl-2-heptadecenyl-imidazoline.

Example 3.—Emulsion magazine ink

To 70 parts of bodied linseed oil were added 20 parts of carbon black, 7 parts of alkali blue and 3 parts of cobalt naphthenate drier. This mixture was passed three times through a three-roller ink mill, after which 1 part of octadecyldimethylamine and 25 parts of water were added. Upon mild agitation a free-flowing black magazine ink of the water-in-oil emulsion type was obtained.

The extraordinary properties of emulsion printing inks embodying my invention have been demonstrated by comparative tests in which a series of black emulsion inks were prepared and tested under identical conditions. The same ordinary black printing ink was used to provide the water-immiscible phase of each ink, together with water and an emulsifying agent which in some cases was a substance typical of those heretofore known to be useful in emulsion printing inks, and in other cases was a long-chain non-aromatic amine of the character hereinabove described. Each emulsion ink was made by first incorporating 11 parts of carbon black in an oily liquid consisting of 3 parts of modified resin dissolved in 86 parts of a commercial ink oil having a viscosity of 0.96 poise at 80° F., then adding one part of the emulsifying agent, and finally adding 20 parts of water and agitating the mixture with an electric stirrer until a homogeneous emulsion ink had formed.

The resulting inks were compared as to their viscosities, yield values and rates of flow. Viscosities were measured with a Brookfield synchroelectric viscosimeter and were expressed in poises at 80° F. Yield values were found as the intercepts of force-flow diagrams obtained with a standard Gardner mobilometer at 80° F. and were expressed in terms of plunger weights necessary to start flow. The conventional "flow" rate at 80° F. was determined and expressed in terms of the distance in inches traversed in one minute by 1.3 milliliters of ink deposited in a sunken cup made in a glass plate, upon changing the position of the plate from horizontal to an angle of 71° from horizontal. The comparative test results follow:

| Ink No. | Emulsifier | Viscosity | Yield Value | Flow |
|---|---|---|---|---|
| | none | 113.0 | 188 | none |
| | calcium oleate | 57.6 | 92 | none |
| | Triethanolamine-oleate | 49.6 | 79 | none |
| | 1-hydroxyethyl-2-heptadecenyl-imidazoline | 36.0 | 54 | 6.8 |
| | octadecylamine | 28.6 | 42 | 8.0 |
| | "Nekal A" (sodium isopropyl naphthalene sulfonate) | 150.0 | 280 | none |
| | Ordinary ink (no water or emulsifier). | 27.6 | 48 | 7.2 |

From this tabulation of the test results it is evident that the inks embodying this invention inks Nos. 4 and 5) had flow qualities quite similar to the ordinary oil ink (No. 7). On the other hand, the inks employing known emulsifying agents, although stable, showed greatly inferior flow qualities; as a matter of practical fact they do not flow at all, which makes them useless for practical printing operations.

Prolonged printing tests on high speed presses have shown that my new inks possess excellent printing qualities superior in several respects to those of ordinary inks, and they have exhibited no disadvantage over ordinary inks by reason of their emulsoid character.

The stability of the new inks was tested by keeping them at 0° F. for one month and then heating them to 80° F., and also by heating them for several weeks at 120° F. No change in the ink was observed under these diversified conditions. Prolonged tests also have shown that they are entirely non-corrosive, which is attributable at least in part to the fact that the long-chain non-aromatic amines employed in these inks all have a more or less pronounced alkaline reaction that assists in the prevention of corrosion.

The chemical nature of these amines makes it imperative to avoid the use of acidic water in the inks herein disclosed. They are bases capable of combining chemically with acids so as to form salts of different chemical and physical character. The use of acid-containing water not only may render the ink corrosive but also may interfere seriously with its desirable free-flowing property, due to elimination of the activity of the amine through its chemical reaction with acid in the water.

It will be understood that the foregoing details and examples are presented to illustrate my invention and are not to be regarded as restrictive except as may be required by a fair interpretation of the appended claims. Various modifications, additions and substitutions will become evident to those skilled in the art and may be made without departing from the invention herein disclosed and claimed.

I claim:

1. A printing ink comprising a stable dispersion of coloring matter consisting substantially of vehicle-insoluble pigment in a vehicle composed essentially of water emulsified in water-immiscible ink vehicle liquid with a long-chain non-aromatic amine containing a linear hydrocarbon chain of at least 15 carbon atoms and having at least 18 carbon atoms attached to a nitrogen atom through carbon bonds, said ink being of the water-in-oil emulsion type and having a yield value and a rate of flow substantially as good as those of an ink composed of the same amounts and kinds of coloring matter and water-immiscible ink vehicle liquid only.

2. A black printing ink comprising a stable dispersion of coloring matter consisting mainly of carbon pigment in a vehicle composed essentially of water, in an amount between 15 and 50% of the weight of the ink, emulsified in water-immiscible ink vehicle liquid by means of a long-chain non-aromatic amine containing a linear hydrocarbon chain of at least 15 carbon atoms and having at least 18 carbon atoms attached to a nitrogen atom through carbon bonds, said ink being of the water-in-oil emulsion type and having a yield value and a rate of flow substantially as good as those of an ink composed of the same amounts and kinds of coloring matter and water-immiscible ink vehicle liquid only.

3. An emulsion printing ink which is stable at all temperatures between 0° and 120° F. and fluid at normal room temperatures, composed essentially of coloring matter consisting substantially of vehicle-insoluble pigment, water-immiscible ink vehicle liquid, and water emulsified in said liquid in a ratio of less than 5 parts of water to 1 part of liquid by means of water and a long-chain non-aromatic amine containing a linear hydrocarbon chain of at least 15 carbon atoms and having at least 18 carbon atoms attached to a nitrogen atom through carbon bonds, said ink being of the water-in-oil emulsion type and having a yield value and a rate of flow substantially as good as those of an ink composed of the same amounts and kinds of coloring matter and water-immiscible ink vehicle liquid only.

4. An emulsion printing ink composed uniformly of coloring matter consisting substantially of vehicle-insoluble pigment, water-immiscible ink vehicle liquid, water in an amount between 15 and 50% of the weight of the ink, and a small amount of a long-chain non-aromatic amine containing a linear hydrocarbon chain of at least 15 carbon atoms and having at least 18 carbon atoms attached to a nitrogen atom through carbon bonds, said ink being of the water-in-oil emulsion type and having a yield value and a rate of flow substantially as good as those of an ink composed of the same amounts and kinds of coloring matter and water-immiscible ink vehicle liquid only.

5. An emulsion printing ink composed uniformly of coloring matter consisting substantially of vehicle-insoluble pigment, water-immiscible ink vehicle liquid, from 15 to 50% by weight of water, and from 0.1 to 2% by weight of a long-chain non-aromatic amine containing a linear hydrocarbon chain of at least 15 carbon atoms and having at least 18 carbon atoms attached to a nitrogen atom through carbon bonds, said ink being of the water-in-oil emulsion type and having a yield value and a rate of flow substantially as good as those of an ink composed of the same amounts and kinds of coloring matter and water-immiscible ink vehicle liquid only.

6. An emulsion printing ink composed uniformly of coloring matter consisting substantially of vehicle-insoluble pigment, water-immiscible ink vehicle liquid, and water emulsified in said liquid with a long-chain non-aromatic amine containing a linear hydrocarbon chain of at least 15 carbon atoms and having at least 18 carbon atoms attached to a nitrogen atom through carbon bonds, the ratio of the content of water to the content of said liquid being less than 5 to 1, said ink being of the water-in-oil emulsion type and having a yield value and a rate of flow substantially as good as those of an ink composed of the same amounts and kinds of coloring matter and water-immiscible ink vehicle liquid only.

7. An emulsion printing ink composed uniformly of coloring matter consisting substantially of vehicle-insoluble pigment, water-immiscible ink vehicle liquid consisting essentially of oil having an oil-soluble resin dissolved therein, and between 15 and 50% by weight of water emulsified in said liquid with a small amount of a long-chain non-aromatic amine containing a linear hydrocarbon chain of at least 15 carbon atoms and having at least 18 carbon atoms attached to a nitrogen atom through carbon bonds, said ink being of the water-in-oil emulsion type and having a yield value and a rate of flow substantially as good as those of an ink composed of the same amounts and kinds of coloring matter and water-immiscible ink vehicle liquid only.

8. A newspaper printing ink consisting essentially of petroleum hydrocarbon oil as the predominant constituent, a small amount of oil-soluble resin dissolved in said oil, coloring matter including carbon black dispersed therein, and water emulsified therein with a long-chain non-aromatic amine containing a linear hydrocarbon chain of at least 15 carbon atoms and having at least 18 carbon atoms attached to a nitrogen atom through carbon bonds, said ink being of the water-in-oil emulsion type and having a yield value and a rate of flow substantially as good as those of an ink composed of the same amounts and kinds of oil, resin and coloring matter only.

9. A newspaper printing ink composed predominantly of an oily ink vehicle containing hydrocarbon oil as the predominant ingredient and a small amount of oil-soluble resin dissolved in said oil, coloring matter including carbon black dispersed in said vehicle, and between 15 and 50% by weight of water emulsified in said vehicle with between 0.1 and 2% by weight of octadecylamine, said ink being of the water-in-oil emulsion type and having a yield value and a rate of flow substantially as good as those of an ink composed of the same amounts and kinds of oily ink vehicle and coloring matter only.

10. A "heat-set" printing ink composed predominantly of water-immiscible ink vehicle liquid consisting essentially of oil-soluble resin dissolved in liquid hydrocarbon having a low vapor pressure at ordinary temperatures and a rapid rate of vaporization at elevated temperatures, water emulsified in said liquid with a long-chain non-aromatic amine containing a linear hydrocarbon chain of at least 15 carbon atoms and having at least 18 carbon atoms attached to a nitrogen atom through carbon bonds, and coloring matter including carbon pigment dispersed with the emulsion, said ink being of the water-in-oil emulsion type and having a yield value and a rate of flow substantially as good as those of an ink composed of the same amounts and kinds of coloring matter and water-immiscible ink vehicle liquid only.

11. A "heat-set" printing ink as described in claim 10 wherein the said amine is 1-hydroxyethyl-2-heptadecenyl-imidazoline.

12. A printing ink comprising drying oil as a predominant constituent together with coloring matter including finely divided pigment dispersed therein and between 15 and 50% by weight of water emulsified therein with a long-chain non-aromatic amine containing a linear hydrocarbon chain of at least 15 carbon atoms and having at least 18 carbon atoms attached to a nitrogen atom through carbon bonds, said ink being of the water-in-oil emulsion type and having a yield value and a rate of flow substantially as good as those of an ink composed of the same amounts and kinds of oil and coloring matter only.

13. A printing ink as described in claim 12 wherein the said amine is octadecylamine.

ANDRIES VOET.

REFERENCES CITED

The following references are of record in the file of this patent:

UNITED STATES PATENTS

| Number | Name | Date |
|---|---|---|
| 1,524,872 | McLeod | Feb. 3, 1925 |
| 1,906,961 | Heckel | May 2, 1933 |
| 2,005,945 | McLeod | June 25, 1935 |
| 2,064,797 | Holsten | Dec. 15, 1936 |
| 2,079,613 | Holt | May 11, 1937 |
| 2,120,588 | Curado | June 14, 1938 |
| 2,267,965 | Wilson | Dec. 30, 1941 |
| 2,347,178 | Fritz | Apr. 25, 1944 |
| 2,357,927 | Berg | Sept. 12, 1944 |

FOREIGN PATENTS

| Number | Country | Date |
|---|---|---|
| 388,072 | Great Britain | Feb. 20, 1933 |